US012725748B2

(12) United States Patent
Han et al.

(10) Patent No.: US 12,725,748 B2
(45) Date of Patent: Sep. 1, 2026

(54) MOTION MECHANISM AND CORRESPONDING CONTACTOR

(71) Applicant: Schneider Electric Industries SAS, Rueil-Malmaison (FR)

(72) Inventors: Xu Han, Shanghai (CN); Yuanzhong Wang, Shanghai (CN); Zhiping Huan, Shanghai (CN); Shaofan Li, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 239 days.

(21) Appl. No.: 18/775,520

(22) Filed: Jul. 17, 2024

(65) Prior Publication Data

US 2025/0029802 A1 Jan. 23, 2025

(30) Foreign Application Priority Data

Jul. 21, 2023 (CN) ......................... 202310906235.6

(51) Int. Cl.
*H01H 50/18* (2006.01)
*H01H 50/02* (2006.01)
*H01H 50/54* (2006.01)

(52) U.S. Cl.
CPC ............ *H01H 50/18* (2013.01); *H01H 50/02* (2013.01); *H01H 50/54* (2013.01)

(58) Field of Classification Search
CPC ........ H01H 50/02; H01H 50/18; H01H 50/54; H01H 50/64; H01H 50/643; H01H 50/546; H01H 50/641; H01H 50/04
See application file for complete search history.

(56) References Cited

U.S. PATENT DOCUMENTS 4,216,452 A 8/1980 Arnoux et al.
5,986,528 A * 11/1999 Meier ...................... H01H 1/54 335/184
9,916,953 B2 3/2018 Weichert et al.

FOREIGN PATENT DOCUMENTS

CN 1553464 A * 12/2004 ............. H01H 50/60
CN 102859631 A * 1/2013 ........... H01H 50/045
CN 204361016 U * 5/2015
FR 1317090 A 2/1963

OTHER PUBLICATIONS

Extended European Search Report dated Nov. 26, 2024 for corresponding European Patent Application No. 24306189.2-1201, 7 pages.

* cited by examiner

*Primary Examiner* — Mohamad A Musleh
(74) *Attorney, Agent, or Firm* — Quinn IP Law

(57) ABSTRACT

A motion mechanism, which is installed on a base and capable of translating in a movement direction. The motion mechanism includes: a moving iron core bracket, provided with a moving iron core and including a first connection part; a moving contact bracket, provided with a moving contact and including a second connection part; a guide support mechanism, through which the motion mechanism is supported on the base to enable the motion mechanism to translate in the movement direction; the first connection part and the second connection part are connected so that the moving iron core bracket and the moving contact bracket can be pivotally connected around a pivot axis perpendicular to the movement direction and a gravity direction. A contactor including the abovementioned motion mechanism also is disclosed.

11 Claims, 3 Drawing Sheets

MOTION MECHANISM AND CORRESPONDING CONTACTOR

TECHNICAL FIELD

The present disclosure relates to the electrical field, in particular to a motion mechanism and a corresponding contactor.

BACKGROUND

Electromagnetic contactors usually generate a magnetic field by energizing the coil. Under the action of the magnetic field, the moving iron core will drive the moving contact to move, so that the moving contact and the stationary contact can contact and separate, and finally the contactor can be turned on and off. In a traditional contactor, the moving contact and the moving iron core are fixed on a bracket to form a motion mechanism, and the motion mechanism is usually an integrated rigid structure.

This structure is relatively simple, and the transmission of movement is relatively direct. But it also brings some problems. The installation direction of contactor is usually to make the movement direction perpendicular to the gravity direction, so as to minimize the influence of gravity on the movement. The moving iron core and the moving contact are usually located on both sides of the motion mechanism, while the moving iron core has a heavy mass. During the movement, due to the influence of gravity, the whole motion mechanism will be tilted, and the moving contact will be offset. This arrangement is not conducive to the balance of the mechanism, affects the service life of the contactor, and may even affect the contact performance between the moving contact and the stationary contact.

In addition, due to the integrated structure of the motion mechanism, in order to install the motion mechanism on the base, it is needed to open a large through hole in the base for the bracket of the motion mechanism to pass through. However, during the movement, the arc pollution carbide and metal particles produced by the arc extinguishing chamber provided with moving contact are easily brought into the chamber provided with iron core coil, and if particles fall on the pole surface of the iron core, it will cause the problem of unstable suction or sticking. At the same time, iron filings and dust generated by friction during the collision of iron cores are also easy to be brought into the arc extinguishing chamber, which affects the electrical performance of the contacts.

Therefore, it is expected to provide a new type of motion mechanism and corresponding contactor which can eliminate the influence of gravity of moving iron core and help reduce the interaction between arc extinguishing and iron core suction function.

SUMMARY

In order to at least partially solve the defects existed in the existing art, the present disclosure provides a motion mechanism, installed on a base and capable of translating in a movement direction, wherein the motion mechanism includes: a moving iron core bracket provided with a moving iron core and including a first connection part; a moving contact bracket provided with a moving contact and including a second connection part; a guide support mechanism through which the motion mechanism is supported on the base to enable the motion mechanism to translate in the movement direction. The first connection part and the second connection part are connected so that the moving iron core bracket and the moving contact bracket can be pivotally connected around a pivot axis perpendicular to the movement direction and a gravity direction.

According to an embodiment of the present disclosure, the guide support mechanism includes a first support part located on the moving iron core bracket, a second support part located on the moving contact bracket and a third support part, and a third support part is located on at least one of the moving iron core bracket and the moving contact bracket.

According to an embodiment of the present disclosure, the third support part is located on the moving contact bracket.

According to an embodiment of the present disclosure, two third support parts are provided, and the two third support parts are symmetrically arranged about a symmetry plane perpendicular to the pivot axis, and the symmetry plane passes through a center of gravity of the motion mechanism.

According to an embodiment of the present disclosure, at least one of the first support part and the second support part are located in the symmetrical plane of the two third support parts.

The present disclosure further provides a contactor, including a stationary contact, a coil, a base and any one of the abovementioned motion mechanism, the base includes a middle base, and the middle base is located between the moving iron core and the moving contact to form two chambers which are mutually isolated.

According to an embodiment of the present disclosure, the motion mechanism further includes a protrusion part protruding in the movement direction, the protrusion part is located on one of the moving iron core bracket and the moving contact bracket and includes the first connection part which corresponds to the moving iron core bracket or the second connection part which corresponds to the moving contact bracket, and, in the motion mechanism, only a part of the protrusion part passes through a corresponding opening in the middle base.

According to an embodiment of the present disclosure, two protrusion parts are provided, and the two protrusion parts are symmetrically arranged about a symmetry plane perpendicular to the pivot axis, and the symmetry plane passes through a center of gravity of the motion mechanism.

According to an embodiment of the present disclosure, the third support part is located on the protrusion part.

According to an embodiment of the present disclosure, the motion mechanism is symmetrical about a symmetry plane perpendicular to the pivot axis.

According to an embodiment of the present disclosure, the motion mechanism is installed such that the movement direction is perpendicular to the gravity direction.

DETAILED DESCRIPTION

Figure 1:
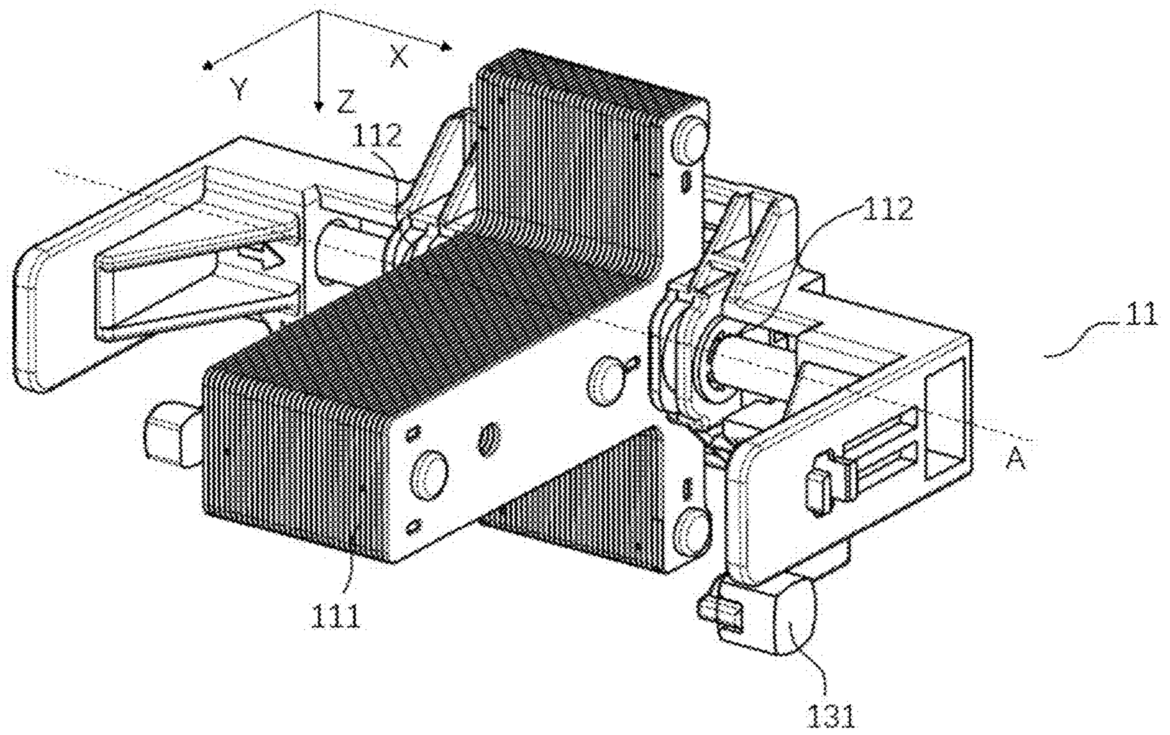
FIG. 1 shows a schematic diagram of a moving iron core bracket according to the present disclosure.

In order to make the purpose, details and advantages of the technical solution of the present disclosure clearer, the technical solution of the embodiment of the present disclosure will be described clearly and completely with the accompanying drawings of specific embodiments of the present disclosure. Unless otherwise specified, the terms used herein have the ordinary meaning in the art. Like reference numerals in the drawings represent like parts.

In the description of the present application, it should be noted that unless otherwise specified and limited, the terms “installation”, “connect” and “connection” should be broadly understood, for example, they can be fixed connection, detachable connection or integrated connection; they can be mechanical connection or electrical connection; they can be directly connected, can also be indirectly connected through an intermediate medium, and can be connected inside two elements.

For convenience of explanation, in the present disclosure, a transverse direction, a movement direction and a vertical direction are defined. Unless otherwise specified, the movement direction is designated as an overall movement direction of the moving mechanism in the contactor according to the present disclosure and is indicated by arrow Y, the gravity direction is designated as a direction of the gravity exerted on the moving mechanism and is indicated by arrow Z, the transverse direction is designated as a direction along which the pivot axis extends and is indicated by arrow X, which are shown to be perpendicular to each other in the figures.

FIG. 1 shows a schematic diagram of a moving iron core bracket 11 according to the present disclosure, wherein the moving iron core bracket 11 includes a moving iron core 111 and a first connection part 112. The moving iron core 111 is configured to move in a movement direction Y under the action of a magnetic field generated by a coil (not shown). The iron core 111 can be centrally arranged on the moving iron core bracket 11 in the transverse direction, so as to facilitate the gravity balance of the motion mechanism 1 in the transverse direction and promote the motion stability and service life of the motion mechanism 1. In addition, the whole iron core bracket 11 can be symmetrical about a plane perpendicular to the transverse direction, so as to further facilitate the gravity balance of the motion mechanism 1 in the transverse direction.

Figure 2:
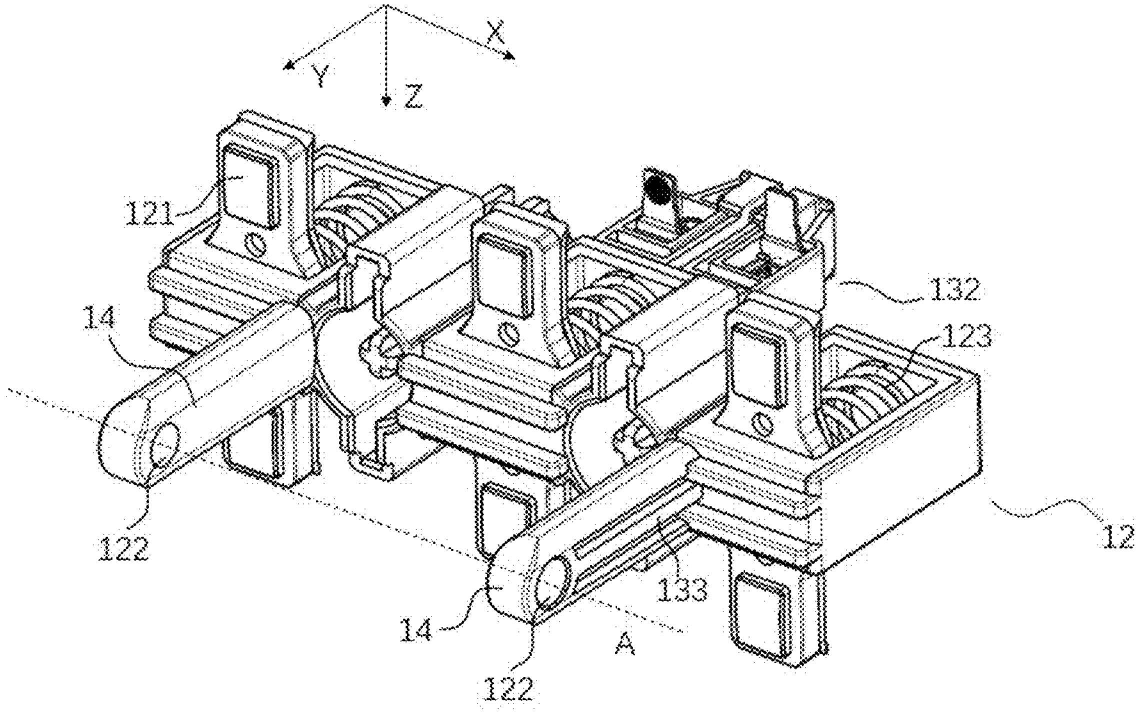
FIG. 2 shows a schematic view of a moving contact bracket according to the present disclosure.

FIG. 2 shows a schematic diagram of the moving contact bracket 12 according to the present disclosure, wherein the moving contact bracket 12 includes a moving contact 121 and a second connection part 122, and a contact surface of the moving contact 121 is perpendicular to the movement direction Y and faces a contact surface of a stationary contact (not shown). When the moving contact bracket 12 drives the moving contact 121 to move in the movement direction Y, the contact and separation between the moving contact 121 and the stationary contact can be realized, thereby realizing the on-off of the contactor. The number of moving contacts 121 can be more than one, for example, two or three. As illustrated by FIG. 2, three moving contacts 121 can be symmetrically arranged at equal intervals in the transverse direction, which is beneficial to the gravity balance of the motion mechanism 1 in the transverse direction. Each moving contact may have one contact surface, or may have more than one contact surface, such as two, as illustrated by FIG. 2. Each moving contact 121 can be provided with an elastic member, such as a spring 123, so that when the stationary contact contacts the moving contact 121, it can play a role of buffering and damping, and the contact performance and service life of the contactor can be improved.

The moving iron core bracket 11 and the moving contact bracket 12 can be configured to be pivotally connected through the first connection part 112 and the second connection part 122, and a pivot axis A of the pivotal connection can be an axis perpendicular to the gravity direction Z and the movement direction Y, so that the pivotal connection can transmit force in the movement direction Y, that is, the moving iron core bracket 11 can drive the moving contact bracket 12 to move in the movement direction Y through the pivotal connection, and vice versa. Moreover, the pivotal connection enables the moving iron core bracket 11 and the moving contact bracket 12 to pivot relative to each other in a plane where gravity is located, thus greatly eliminating the influence of the weight of the moving iron core bracket 11 on the moving contact bracket 12. During the movement of the motion mechanism 1, due to the influence of inertia and gravity, even if the heavy moving iron core bracket 11 tilts, for example, around the axis parallel to the pivot axis, it will not cause the whole motion mechanism 1 or the light moving contact bracket 12 to tilt (or upwarp) correspondingly. Instead, because the moving iron core bracket 11 pivots relative to the moving contact bracket 12 and the pivot connection part (that is, the first connection part 112 and/or the second connection part 122) moves in the gravity direction Z under the gravity of the moving contact bracket 12 itself, the inclination of the moving contact 121 is greatly reduced or avoided.

Figure 3:
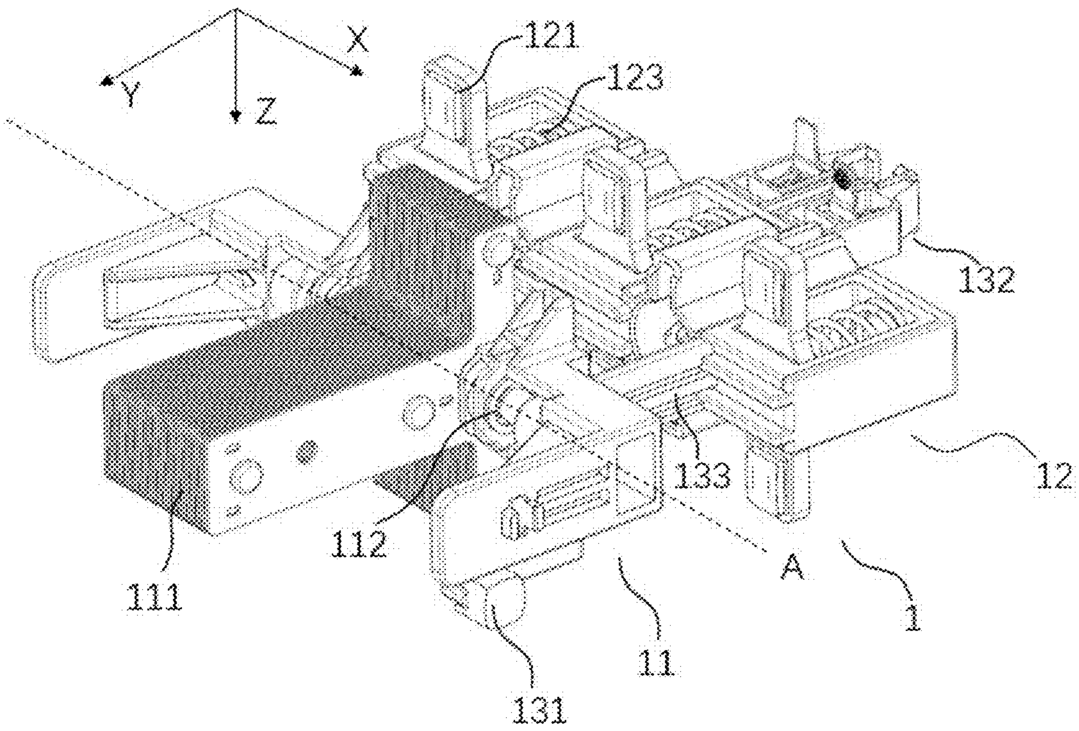
FIG. 3 shows a schematic diagram of a motion mechanism including a moving iron core bracket and a moving contact bracket according to the present disclosure.

The pivotal connection can be formed by the cooperation of a shaft and a hole, for example. As illustrated by FIGS. 1-3, both the first connection part 121 and the second connection part 122 are through holes, and they are concentrically pivotally connected through a shaft. Alternatively, one of the first connection part 121 and the second connection part 122 is in the form of a shaft, and the other is in the form of a hole. In addition, the pivot connection can also include hinged fit, long hole and pin sliding fit and other forms. As illustrated by FIGS. 1-3, the numbers of the first connection parts 121 and the second connection parts 122 are both two, and they are symmetrical with respect to a plane perpendicular to the transverse direction X and passing through a center of gravity of the motion mechanism 1. This symmetrical arrangement is beneficial to the gravity balance of the motion device 1 in the transverse direction and the stability of the motion.

The motion mechanism 1 also includes a guide support mechanism, which enables the motion mechanism 1 to be supported on a base (partially shown in FIG. 4) so as to be movable in the movement direction Y, in particular to translate, for example, through the cooperation of a sliding part, such as a slider protrusion or pulley, and a guiding part, such as a guide rail or a groove.

Specifically, the moving iron core bracket 11 and the moving contact bracket 12 may each have, for example, two, three or four support parts, to realize smooth movement and support. As illustrated by FIG. 3, the guide support mechanism may include a first support part 131, a second support part 132 and a third support part 133. The first support part 131 is located on the moving iron core bracket 11, the second support part 132 is located on the moving contact bracket 12, and the third support part 133 is located on one of the moving iron core bracket 11 and the moving contact bracket 12, so as to reduce the number of support parts and the number of corresponding matching parts on the base, thereby reducing the requirements and difficulty of assembly and manufacture, which is conductive to reducing the costs. For example, as illustrated by FIGS. 2 and 3, the third support part 133 is located on the moving contact bracket 12 to increase the motion stability of the moving contact bracket 12. For example, the first support part 131 and the second support part 132 may be sliding parts, and, for example, the third support part 133 may be a guide part.

The number of the third support parts 133 may be two, and only one of them is shown in FIGS. 2 and 3 due to the viewing angle. However, it is conceivable that the two third support parts 133 are symmetrical about a plane perpendicular to the transverse direction X and passing through the center of gravity of the motion mechanism 1, which is beneficial to increasing the stability of support and motion. The first support part 131 and/or the second support part 132 can be located in the symmetrical plane of the two third support parts 133 to form a three-point support in a shape of an isosceles triangle, so as to further increase the stability of support and movement.

The whole moving mechanism 1 can be symmetrical about a plane perpendicular to the transverse direction X and passing through the center of gravity of the moving mechanism 1, which is beneficial to the gravity balance of the movement device 1 in the transverse direction and the stability of the movement.

The present disclosure also includes a contactor including a stationary contact (not shown), a coil (not shown), a base, and any one of the above-mentioned motion mechanisms 1. In the contactor according to the present disclosure, the motion mechanism 1 is installed so that the pivot axis A of the moving iron core bracket 11 and the moving contact bracket 12 are perpendicular to the movement direction Y and the gravity direction Z, so as to reduce the influence of the gravity of the moving iron core bracket 11 as described above. In addition, the motion mechanism 1 is installed so that the movement direction Y is perpendicular to the gravity direction Z, so as to reduce the influence of gravity on the motion of the contacted moving contact 121, which is beneficial to the contact performance and stability of the contactor.

Figure 4:
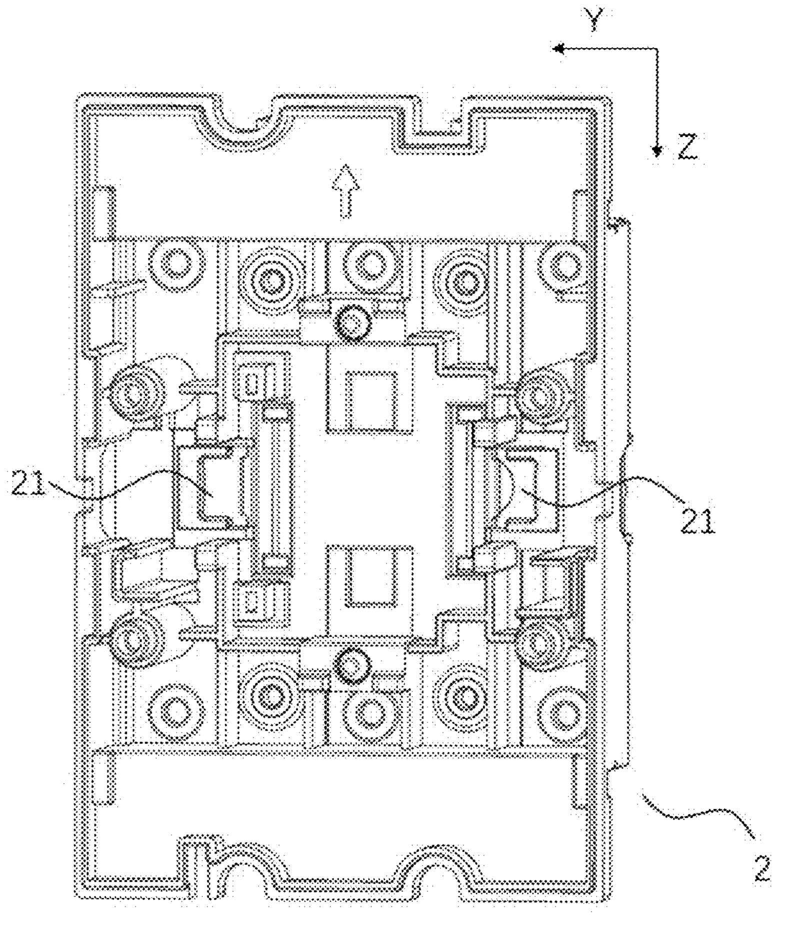
FIG. 4 shows a schematic view of a middle base of a contactor according to the present disclosure.
Figure 5:
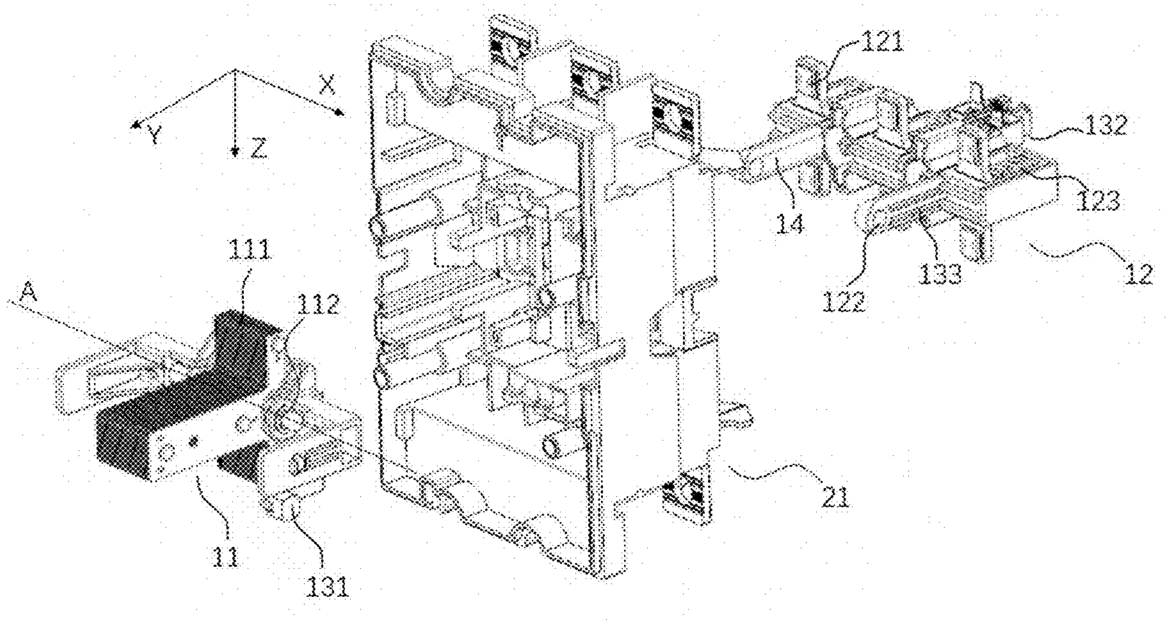
FIG. 5 shows a partially exploded schematic view of a contactor including a motion mechanism and a middle base according to the present disclosure, showing that the middle base is located between a moving iron core and a moving contact.

FIG. 4 shows a schematic view of a middle base 2 of a contactor according to the present disclosure, the middle base 2 is a part of the base, and the rest of the base is not shown; FIG. 5 shows a partially exploded schematic view of a contactor including a motion mechanism 1 and a middle base 2 according to the present disclosure, showing that the middle base is located between a moving iron core and a moving contact.

The base may include a middle base 2, which is arranged between the moving iron core bracket 11 and the moving contact bracket 12 to form two chambers which are mutually isolated, specifically, an iron core suction chamber and an arc extinguishing chamber, so as to reduce the mutual interference between the iron core suction function and the arc extinguishing function.

In addition, the base can also be provided with matching support parts (not shown) corresponding to the above-mentioned guiding support mechanism, for example, a first matching support part corresponding to the first support part 131, a second matching support part corresponding to the second support part 132 and a third matching support part corresponding to the third support part 133, so that the moving mechanism 1 can be kept on the base and thus can move in the movement direction R.

As illustrated by FIGS. 2 and 5, the motion mechanism 1 further includes a protrusion part 14, and the protrusion part 14 can be located on one of the moving iron core bracket 11 and the moving contact bracket 12 and extend in the movement direction Y, and the first connection part 112 corresponding to the moving iron core bracket 11 or the second connection part 122 corresponding to the moving contact bracket 12 is located on the protrusion part 14, so that, in the motion mechanism 1, only a part of the protrusion part 14 passes through the opening 21 of the middle base 2, thereby realizing that the middle base 2 is arranged between the moving iron core 111 and the moving contact 121. Through this arrangement, there is no need to open a relatively large opening 21 in the middle base 2 for the whole moving mechanism 21 to pass through, which is beneficial to further reducing the mutual influence between the iron core suction chamber and the arc extinguishing chamber.

In particular, the shape and size of the opening 21 are set to form a small gap with the protrusion part 14, for example, 1 mm, 0.5 mm, etc. It is beneficial to further reducing the interaction between the iron core suction chamber and the arc extinguishing chamber.

In addition, as illustrated by FIG. 2 and FIG. 5, the protrusion part 14 can be arranged on the moving contact bracket 12, and the protrusion part 14 can be set to be relatively long, which is beneficial to reducing the movement of the center of gravity of the moving contact bracket 12 in the gravity direction Z, and further reducing the influence of the fluctuation of the center of gravity of the moving iron core bracket 11 on the moving contact bracket 12.

Two third support parts 133 can also be provided on the protrusion parts 14, and the number of the protrusion parts 14 can be set to two. As illustrated by FIG. 5, the protrusion parts 14 are symmetrical with respect to the plane perpendicular to the transverse direction X and passing through the center of gravity of the motion mechanism 1, so as to further increase the motion stability of the motion mechanism 1.

It should be understood that the above description is intended to be illustrative rather than limiting. For example, the above embodiments (and/or aspects thereof) may be used in combination with each other. In addition, many modifications may be made to adapt a particular situation or material to the teachings of this disclosure without departing from its scope. The functions or performances of various elements or modules described herein are only for illustration and are in no way restrictive, but only exemplary embodiments. Many other embodiments and modifications within the spirit and scope of the claims will be apparent to those skilled in the art after reading the above description. Therefore, the scope of the present disclosure should be determined with reference to the appended claims, along with the full scope of equivalents to which such claims are entitled.

In the appended claims, the terms "comprising" and "wherein" are used as simple English equivalents of the corresponding terms "including" and "in which". Furthermore, in the following claims, the terms "first", "second" and "third" are only used as labels, and no numerical requirements are intended to be imposed on their objects.

REFERENCE NUMERALS

1—motion mechanism
11—moving iron core bracket

111—moving iron core
112—first connection part
12—moving contact bracket
121—moving contact
122—second connection part
123—spring
131—first support part
132—second support part
133—third support part
14—protrusion part
2—middle base
21—opening
A—pivot axis
X—transverse direction
Y—movement direction
Z—gravity direction

The invention claimed is:

1. A motion mechanism installed on a base and capable of translating in a movement direction, wherein the motion mechanism comprises:

a moving iron core bracket provided with a moving iron core and comprising a first connection part;

a moving contact bracket provided with a moving contact and comprising a second connection part;

a guide support mechanism through which the motion mechanism is supported on the base so as to translate in the movement direction;

wherein the first connection part and the second connection part are connected so that the moving iron core bracket and the moving contact bracket can be pivotally connected around a pivot axis perpendicular to the movement direction and a gravity direction.

2. The motion mechanism according to claim 1, wherein the guide support mechanism comprises a first support part located on the moving iron core bracket, a second support part located on the moving contact bracket and a third support part located on at least one of the moving iron core bracket and the moving contact bracket.

3. The motion mechanism according to claim 2, wherein the third support part is located on the moving contact bracket.

4. The motion mechanism according to claim 2, wherein two third support parts are provided and symmetrically arranged about a symmetry plane perpendicular to the pivot axis, and the symmetry plane passes through a center of gravity of the motion mechanism.

5. The motion mechanism according to claim 4, wherein at least one of the first support part and the second support part are located in the symmetrical plane of the two third support parts.

6. A contactor, comprising a stationary contact, a coil, a base and the motion mechanism installed on a base and capable of translating in a movement direction, wherein the motion mechanism comprises:

a moving iron core bracket provided with a moving iron core and comprising a first connection part;

a moving contact bracket provided with a moving contact and comprising a second connection part;

a guide support mechanism through which the motion mechanism is supported on the base so as to translate in the movement direction;

wherein the first connection part and the second connection part are connected so that the moving iron core bracket and the moving contact bracket can be pivotally connected around a pivot axis perpendicular to the movement direction and a gravity direction, wherein the base comprises a middle base, and the middle base is located between the moving iron core and the moving contact to form two chambers which are isolated from each other.

7. The contactor according to claim 6, wherein the motion mechanism further comprises a protrusion part protruding in the movement direction, the protrusion part is located on one of the moving iron core bracket and the moving contact bracket and includes the first connection part corresponding to the moving iron core bracket or the second connection part corresponding to the moving contact bracket, and, in the motion mechanism, only a part of the protrusion part passes through a corresponding opening in the middle base.

8. The contactor according to claim 7, wherein two protrusion parts are provided and symmetrically arranged about a symmetry plane perpendicular to the pivot axis, and the symmetry plane passes through a center of gravity of the motion mechanism.

9. The contactor according to claim 7, wherein the third support part is located on the protrusion part.

10. The contactor according to claim 6, wherein the motion mechanism is symmetrical about a symmetry plane perpendicular to the pivot axis.

11. The contactor according to claim 6, wherein the motion mechanism is installed such that the movement direction is perpendicular to the gravity direction.

* * * * *